[55.] CHARLES B. MANN & STEPHEN S. MANN.

Improvement in Lamps.

No. 4,572. Reissued Sep. 26, 1871.

Witnesses:
G. Mathys.
Solon C. Kemon

Inventor:
Chas. B. Mann.
Stephen S. Mann.
Per Munn & Co
Attorneys.

AM. PHOTO-LITHOGRAPHIC CO. N.Y. (OSBORNE'S PROCESS.)

UNITED STATES PATENT OFFICE.

CHARLES B. MANN AND STEPHEN S. MANN, OF BALTIMORE, MARYLAND.

IMPROVEMENT IN LAMPS.

Specification forming part of Letters Patent No. 114,954, dated May 16, 1871; reissue No. 4,572, dated September 26, 1871.

*To all whom it may concern:*

Be it known that we, CHARLES B. MANN and STEPHEN S. MANN, of Baltimore, in the county of Baltimore and State of Maryland, have invented a new and useful Improvement in Safety and Filling Attachments for Lamps; and we do hereby declare the following to be a full, clear, and exact description of the same, reference being had to the accompanying drawing making a part of this specification.

Figure 2:
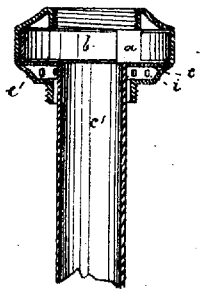
Figure 1:
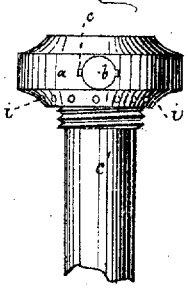
Figure 3:
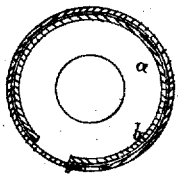

The object of our invention is to provide for public use a safety attachment for lamps designed for burning hydrocarbon oils, whereby danger of explosion shall be removed. The invention relates to such construction of a long wick and filling-tube, and a drum, so combined and relatively constructed that the gas or vapor generated within the lamp-reservoir, around or outside the tube, may be conducted off without possibility of contact with the flame of the burner, either exteriorly or interiorly, by way of the wick-tube. The drum is provided with an orifice for insertion of the nozzle of an oil-can, and so connected with the wick and filling-tube as to form vapor-outlets exterior to said tube, so that the device performs the office of a safety-filling attachment, and also a safety attachment proper, irrespective of the provision of a filling-orifice in the drum. It is indispensable to our invention that the wick and filling-tube should be what is commonly denominated a "long tube," *i. e.*, one that shall, in every instance, descend nearly to the bottom of the lamp-reservoir, or at least below the point at which the oil is usually maintained. Thus, no gas generated from the oil outside of or around the tube can find escape through the filling-orifice of the drum when the lamp is being replenished, as it is frequently desirable and even necessary to do, with the flame of the wick at full height. On the contrary, the gas thus evolved finds its way uninterruptedly into the outer air through the medium of passages formed in connection with the upper end of the tube and bottom of the drum. Our invention is designed for application to no special form of hydrocarbon lamps, but for those already in use as well as new and improved varieties. It constitutes a separate and distinct article of manufacture and sale; and hence the drum is provided with male and female-screw connections to adapt it for attachment, respectively, to the collar and burner of a lamp. By our improvement the necessity or pretext of occasion for the use of safety-burners, or lamps of peculiar and expensive construction, is wholly removed, and the means of safety in burning-oils of a more or less explosive and inflammable nature placed within the reach of all at a minimum cost. Referring to the drawing for a practical understanding of our invention, Figure 1 shows a side elevation of our improvement. Fig. 2, a sectional elevation; and Fig. 3 a transverse section of the same taken through the drum.

*a* is the drum, constructed so as to form an annular gas-chamber, provided with male and female-screw connections, and designed to be interposed between the burner and collar of the lamp. In its longitudinal section said drum may be variously shaped, the object being to provide room for a sufficiently large opening to admit the feeder-nozzle and at the same time avoid unnecessarily elevating the burner. Fitted within this connecting-drum is a segmental slide, *b*, made of spring brass, which retains its place by pressing against the interior of the drum, and is actuated on the outside by a thumb-piece, *c*, and provided with a stop. This slide is in the form of a divided ring, or a ring with a section cut out so as to leave an opening corresponding to or exceeding in width the orifice in the side of the drum. The expansion of the ring-slide, which is, in effect, a spring, holds it in close contact with the inner wall of the drum so as to effectually prevent the escape of oil when the same is closed. By moving this slide one way the opening will admit the nozzle of the can, and by moving it in the opposite direction the opening is closed. The wick and filling-tube *c'* extends down into the reservoir or fount to near the bottom, inclosing the wick in a gas-tight compartment. The wick-chamber is made, preferably, round, and large enough internally to easily admit the size of wick intended to be used, whether it be tubular or flat. The upper end of this wick-chamber is fitted within, and secured to an annular plate or metallic diaphragm that is tightly secured within the drum *a* just above the outlets or ventilating-holes, hereinafter referred to.

When the drum is constructed without the filling-orifice the wick-chamber may be differently secured; in such case, the upper end of the long tube may be turned over outward, forming its edge into a flange, *e*, which is then made fast within the connecting-drum, which, in this case, will be of less diameter than when employed as a filling attachment. An intervening space is formed between the male screw and the tube, which constitutes a passage for escape of gas or vapor upward. It is not, of course, material whether this passage be continuous, *i. e.*, an annular one, or closed except at one point, so long as the gas is not hindered in its flow. A series of small ventilating-holes, *i*, large enough to afford escape for the vapor or gas generated within the reservoir, but too small to allow the inward passage of flame, is arranged in the connecting-drum. These holes are under the annular plate, in which the end of the long tube is secured, or under the outward-turned flange at the top of the long tube. The vapor or gas within the lamp-reservoir can pass up around the outside of the wick and filling-tube until it reaches these outlets, and thence escapes from the inside of the lamp to a distance sufficient to prevent ignition, or without endangering an explosion. When filling the lamp these holes allow the air or gas within to escape as the same is displaced by the oil that is turned in. The wick being inclosed, the supply of oil to feed the flame is always taken from the bottom of the reservoir, and no appreciable or material quantity of vapor or gas can surround the wick within, as the tube is always closed with oil at its lower end, and there is no other connection between its interior and the reservoir. The tube at its lower end is rounded on the edge, so that as the wick is raised the end depending below will not catch. It is manifest that an incidental advantage is obtained from the fact that the interposition of the drum or chamber between the burner and collar of a lamp partially isolates the former, or prevents the conduction of heat to the oil to a great degree, if not entirely. No special care is requisite in filling the lamp when burning at full flame; or if the filling-orifice be dispensed with, the same operation may, if desired, be effected by simply unscrewing the burner and inserting the can-nozzle, since there will, in that case, be no greater escape of gas than in the other, the passages around the head of the tube having previously allowed it to flow out freely and constantly as formed.

Having thus described our invention, what we claim as new, and desire to secure by Letters Patent, is—

1. A safety-filling attachment for lamps, consisting of a long wick and filling-tube, and a drum having an orifice for the insertion of the nozzle of an oil-can, and provided with the spring-slide *b* or other suitable device to close said orifice, and so constructed as to provide outlets for the vapor from the reservoir of the lamp while preventing its escape through the tube and drum, substantially in the manner shown and described, and for the purpose specified.

2. In a safety-filling attachment for lamps the spring-slide *b*, constructed and arranged in connection with the drum *a*, substantially as described.

3. In an attachment for lamps, the long wick and filling-tube *c*, when forming, in connection with the drum, an annular chamber, which is provided with outlets and communicates with the lamp-reservoir, substantially as described.

4. In an attachment for lamps, consisting of a drum having screw-connections and a long wick and filling-tube, ventilating-holes in the drum, and a vapor-passage in the screw-neck of the drum for the outlet of vapor from the lamp-reservoir, as described.

5. In an attachment for lamps a long wick and filling-tube, and a drum with screw-connections, when secured together by means of a flange on the head of the tube, so as to leave an annular space between the tube and the screw-neck of the drum, for the purpose specified.

6. The safety attachment for lamps, consisting of the long wick and filling-tube *c*, and a drum having screw-connections, and which is provided with an annular gas-chamber with ventilating-holes in it, and constructed to form the space between its male-screw neck and the long wick-tube, substantially in the manner described, and for the purpose specified.

CHARLES B. MANN.
STEPHEN S. MANN.

Witnesses:
C. M. DODSON,
H. G. BENSON.